Nov. 30, 1965   R. D. JOHNSTON   3,220,414
SURGICAL CANNULA
Filed April 30, 1962   3 Sheets-Sheet 1
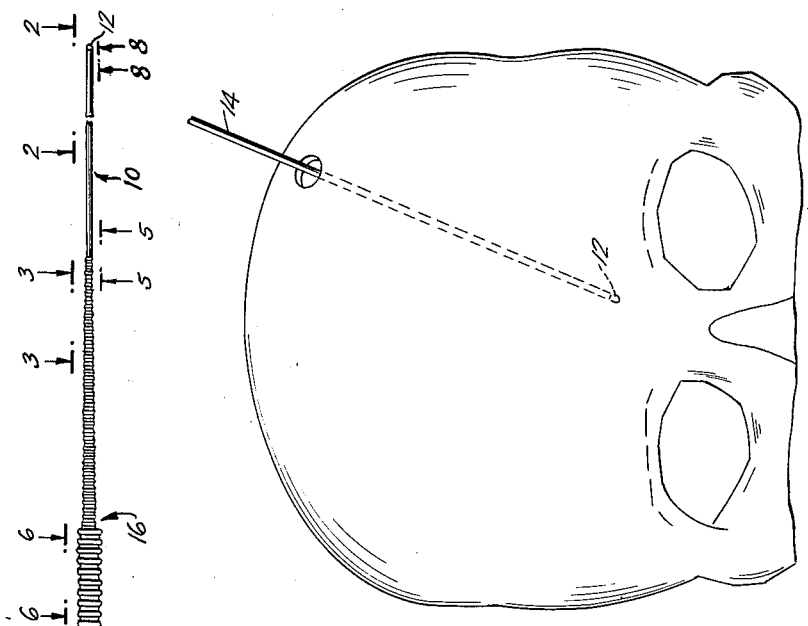
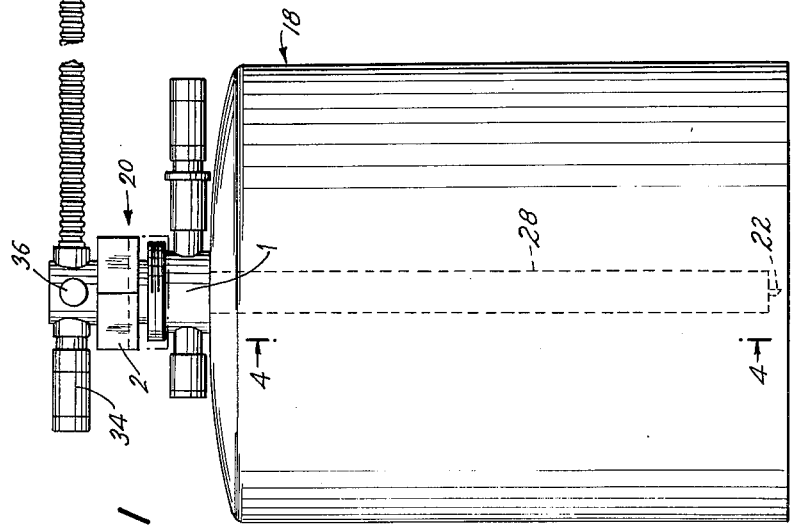
INVENTOR.
ROBERT D. JOHNSTON
BY John C. LeFever
ATTORNEY INVENTOR.
ROBERT D JOHNSTON
BY John C. LeFever
ATTORNEY

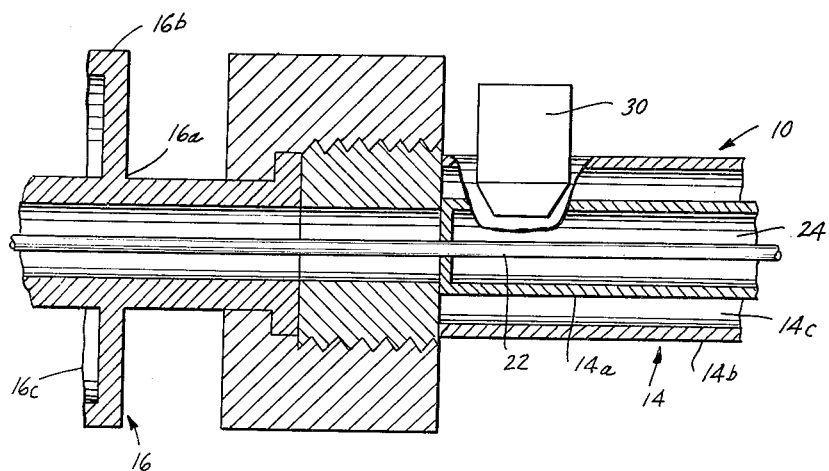
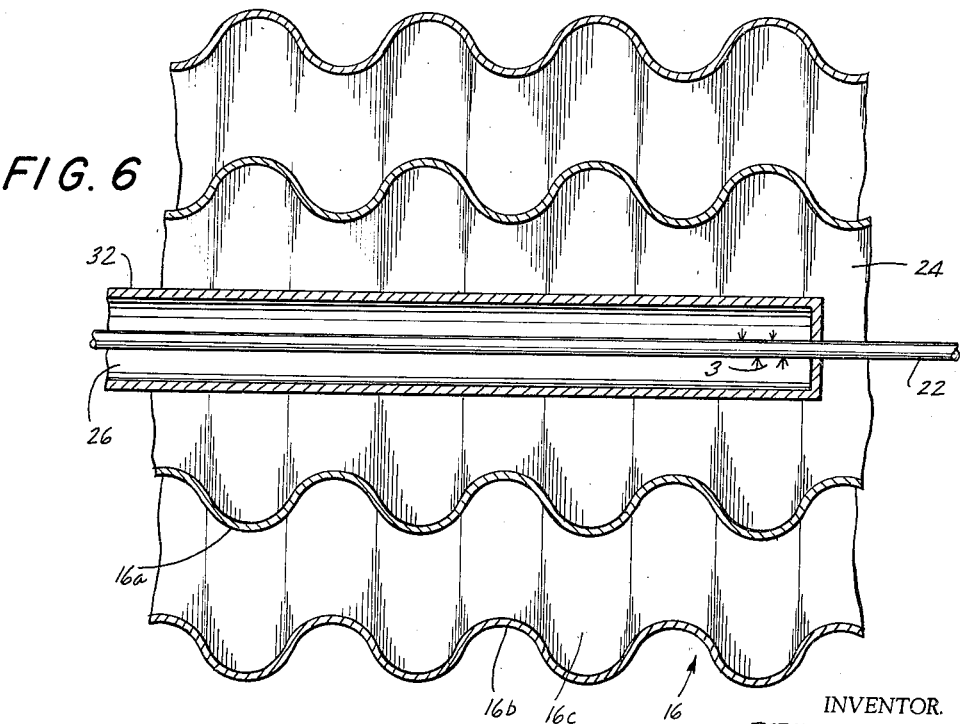

| United States Patent Office | 3,220,414
Patented Nov. 30, 1965 |
|---|---|

3,220,414
SURGICAL CANNULA
Robert D. Johnston, Brownsburg, Ind., assignor to Union Carbide Corporation, a corporation of New York
Filed Apr. 30, 1962, Ser. No. 191,113
12 Claims. (Cl. 128—400)

This apparatus relates generally to surgical apparatus and particularly to a surgical cannula suitable for performing various types of brain surgery such as neurosurgery and surgery to remove brain tumors.

In general, brain surgery such as neurosurgery involves the destruction of biological tissue resulting in the restoration and/or preservation of normal central nervous system functions. Techniques developed to accomplish these results by tissue destruction have attempted to achieve, inter alia; (1) the ability to test the effect of tissue destruction prior to the actual irreversible infliction thereof; (2) the definition of the requisite parameters necessary to reproduce identical tissue destruction under similar conditions; (3) the prevention of normal tissue destruction; (4) the ability to vary the amount of tissue destruction in individual cases; (5) safety from harmful side effects; (6) simplicity in the surgical technique; (7) and rapidity of destructon to enhance the possibility of a successful conclusion to the operation. Heretofore, no surgical apparatus has been available to permit the development of techniques designed to achieve the ideal results just stated.

Brain surgery for the removal of brain tumors also has been severely restricted by a lack of adequate apparatus. Tumors which are located deep within the brain or located in a particularly critical portion thereof have often been considered inoperable because the non-availability of adequate apparatus prevented the development of surgical techniques necessary for the successful destruction of such tumors.

It is, therefore, a primary object of the present invention to provide surgical apparatus which fulfills the criteria necessary for the development of neurosurgical techniques designed to achieve the aforementioned ideal results. A further object is to provide surgical apparatus suitable for use in destroying brain tumors often formerly considered to be inoperable. Another object is to provide apparatus suitable for effecting the surgical destruction of biological tissue anywhere in the body in a more efficient and convenient manner than heretofore possible with present day apparatus. These and other objects and advantages will become apparent from the following description and the accompanying figures in which:

FIGURE 1 is a diagrammatical view of a surgical system embodying the present invention;

FIGURE 5 is a segmental view partially in cross-section taken along the lines 5—5 of FIGURE 1;

FIGURE 6 is a segmental view partially in cross-section taken along the lines 6—6 of FIGURE 1;

FIGURE 7 is a reproduction of an X-ray taken during an operation employing the present invention.

Figure 2:
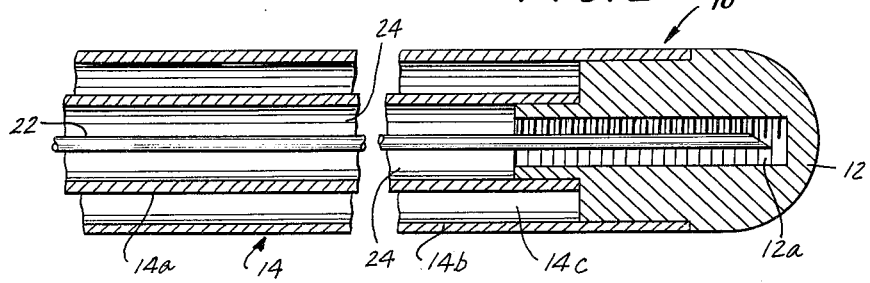
FIGURE 2 is a segmental view partially in cross-section taken along lines 2—2 of FIGURE 1.

The present invention comprises a complete system for use in cryogenic surgery. A cryogenic liquid having a normal atmospheric boiling point below about −100° C., such as liquid nitrogen, oxygen, certain of the Freons, and the like, is used as a coolant and a vacuum insulation is utilized for protection of all biological tissues except those being surgically attacked. It should be understood that the choice of the particular coolant used is solely determined by the low temperature desired and not by the chemical nature of the liquid inasmuch as such liquid does not at any time contact the biological tissue. The success of the present invention in providing for the achievement of the aforementioned objects has been documented in both animals and humans. Cryogenic neurosurgical techniques developed in conjunction with use of the present invention have been successfully applied to basal ganglia surgery, intracerebral neoplasms, hypophysectomy and other operations.

The present invention, as shown in the FIGURE 1 embodiment, comprises a surgical cannula 10 having a thermally conductive tip member 12, a transfer conduit 16 for connecting surgical cannula 10 to a source 18 of cryogenic liquid, and connecting means 20 used to attach transfer conduit 16 to the cryogenic liquid supply source 18. Surgical cannula 10 may either be permanently attached to transfer conduit 16 by means such as welding or brazing as shown in FIGURE 1, or be threadedly attached as shown in FIGURE 5. Transfer conduit 16 may be attached to connecting means 20 by means such as welding or brazing.

With reference to FIGURE 2, this particular embodiment of surgical cannula 10 comprises thermally conductive tip member 12 having a hollow interior portion 12a, a cannula conduit 14 having inner and outer tubes, 14a and 14b respectively, with an evacuable insulating space 14c therebetween. A first end of cannula conduit 14 is connected to tip member 12 by means such as soldering or brazing. Alternately, tip member 12 could be threadedly engaged to cannula conduit 14 to permit the substitution of tip members having different configurations. FIGURE 2 shows a first end portion of a cryogenic liquid supply conduit 22 extending longitudinally into cannula conduit 14 in liquid communication with the hollow interior portion 12a of tip member 12 for the discharge of cryogenic liquid therein. A second end portion of cryogenic liquid supply conduit 22 (see FIGURE 4) is communicable with the cryogenic liquid supply source 18 through connecting means 20 (see FIGURE 1). A venting space 24 within the inner tube 14a of cannula conduit 14 surrounds the first end portion of cryogenic liquid supply conduit 22 and is provided in fluid communication with the hollow interior portion 12a of tip member 12 to provide for the venting of fluid from the latter.

Figure 8:
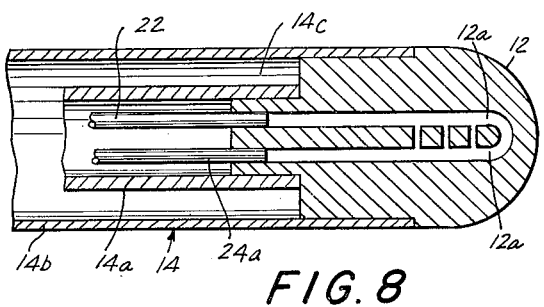
FIGURE 8 is a segmental view partially in cross-section taken along lines 8—8 of FIGURE 1.

The particular embodiment of tip member 12 shown in FIGURE 2 has a spherically shaped exposed exterior surface with the back portion thereof evenly mating with the outer surface of cannula conduit 14. This construction, as will be discussed in detail subsequently, is particularly desirable where a cooled sphere of uniform diameter around tip member 12 is desired. Depending on the desired configuration of cooled area immediately surrounding the tip member, other tip member shapes may be employed such as curved or flat spatular shapes or various curved shapes such as a corkscrew shape. Because the tip member is constructed of a highly thermally conductive material such as silver, or other highly conductive material, the heat transferred through the tip member will meet virtually no thermal resistance and therefore the cooled area immediately surrounding the tip member will tend to assume the shape of the tip member employed. For some tip member configurations, it may be preferable to replace venting space 24 with a venting conduit 24a as shown in FIGURE 8 communicating with hollow interior portion 12a and being positioned longitudinally adjacent to cryogenic liquid supply conduit 22.

In order to ensure that the maximum heat transfer will be achieved for a given rate of cryogenic liquid flow, it is necessary to recover as much of the refrigerating effects of the fluid venting from the hollow interior portion 12a as possible. Hollow interior portion 12a of tip member 12 may be formed by various methods designed to increase heat transfer, a preferred method being to bore the solid tip member and then thread the bored hole to produce the hollow interior portion 12a with heat transfer fins as shown in FIGURE 2. The spirally threaded hole increases the heat transfer area of the tip member thereby recovering additional refrigeration from the venting fluid.

Figure 3:
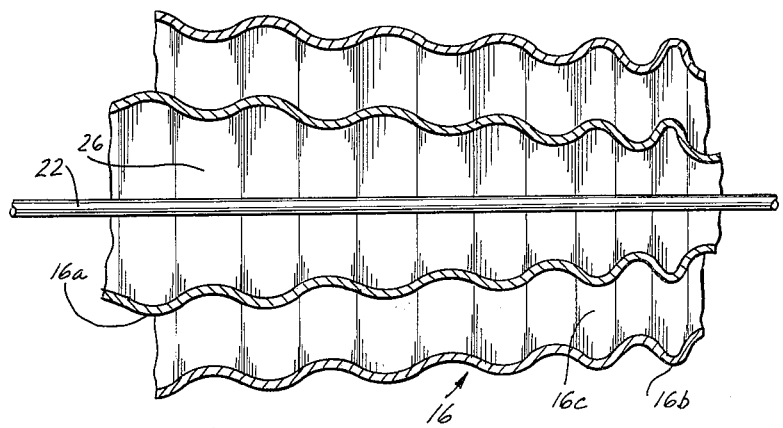
FIGURE 3 is a segmental view partially in cross-section taken along lines 3—3 of FIGURE 1.

FIGURE 3 shows a section of an embodiment of transfer conduit 16 comprising inner and outer tubes, 16a and 16b respectively, with an evacuable insulating space 16c therebetween. Tranfer conduit 16 surrounds an intermediate portion of cryogenic liquid supply conduit 22 between the first end portion thereof, shown in FIGURE 2, and the second end portion thereof, shown in FIGURE 4, that is communicable with the cryogenic liquid supply source 18 of FIGURE 1. A precooling space 26 within the inner tube 16a of transfer conduit 16 surrounds the intermediate portion of cryogenic liquid supply conduit 22 and is provided to permit precooling of such intermediate portion prior to cryogenic liquid transfer from the cryogenic liquid supply source 18 to the surgical cannula 10 of FIGURE 1. This precooling feature is described subsequently.

Figure 4:
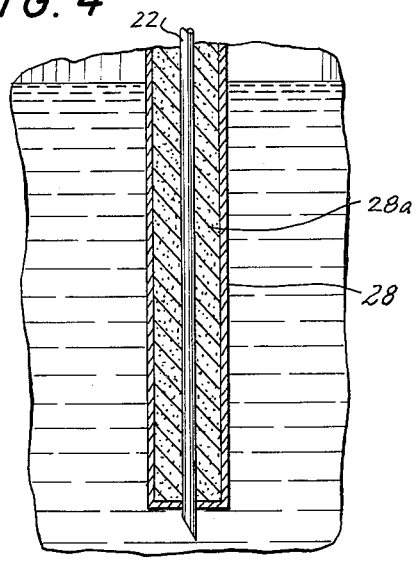
FIGURE 4 is a segmental view partially in cross-section taken along the lines 4—4 of FIGURE 1.

In FIGURE 4, an embodiment of the second end portion of cryogenic liquid supply conduit 22 is shown which extends into cryogenic liquid supply source 18. When connecting means 20 is attached to the cryogenic liquid supply source 18 of FIGURE 1, the second end portion of cryogenic liquid supply conduit 22 is positioned in the cryogenic liquid as shown in FIGURE 4. This second end portion of cryogenic liquid supply conduit 22 is preferably surrounded by an evacuable insulating space 28a between the outer surface of such second end portion and the inner surface of a conduit 28. The insulating space 28a preferably contains a gas adsorbent material as shown to maintain the vacuum therein. One such adsorbent material and its effects are described in U.S. Patent 2,900,800 issued to P. E. Loveday. The lower end of conduit 28 is gas tightly connected to the outer surface of the second end portion of cryogenic liquid supply conduit 28 and the upper end of conduit 28 is connected to connecting means 20 of FIGURE 1.

In the embodiment shown in FIGURES 1, 2, 3, and 4, the surgical cannula evacuable insulating space 14c of FIGURE 2, the transfer conduit evacuable insulating space 16c of FIGURE 3, and the adsorbent evacuable insulating space 28a of FIGURE 4 are in gas communication and the vacuum therein is maintained by the adsorbent in space 28 positioned as shown in FIGURE 4. All three evacuable insulating spaces may be entirely separate from the others or, for example, only evacuable insulating spaces 28a and 16c may be in gas communication and evacuable insulating space 14c entirely separate. In this latter construction, evacuable insulating spaces 14c and 16c could be separated by means attaching the second end of cannula conduit 14 to the first end of transfer conduit 16.

FIGURE 5 shows such an arrangement and in addition shows a vent 30 providing for the venting of fluid from the venting space 24.

FIGURE 6 shows another embodiment of transfer conduit 16 wherein precooling space 26 is preferably enclosed by a precooling conduit 32 that longitudinally surrounds a substantial section of the intermediate portion of cryogenic liquid supply conduit 22 and is connected to connecting 20 of FIGURE 1 in gas communication with a precool vent 34 to provide for the precooling of space 26. This precooling feature is described subsequently. This arrangement permits the extension of venting space 24 from surgical cannula 10 through transfer conduit 16 between the inner surface of inner tube 16a and the outer surface of precooling conduit 32. In such an embodiment, a vent 36, such as shown in FIGURE 1 would be connected to connecting means 20 in the same manner as precool vent 34.

As shown in FIGURES 1, 3 and 6, the conduits 14a and 14b of the transfer conduit are preferably constructed of elongated bellows tubes. The use of bellows tubes provides a high degree of flexibility that is an important factor in increasing the versatility of the surgical cannula 10. To further increase the surgical cannula versatility, the preferred embodiment shown in FIGURE 1 employs two sets of bellows tubes. The smaller set that attaches to surgical cannula 10 is very flexible and the larger set that attaches to connecting means 20 is less flexible.

Instead of being one continuous conduit extending from cryogenic liquid supply source 18 through transfer conduit 16 into surgical cannula 10, cryogenic liquid supply conduit 22 could comprise three separate sections, one for each of the three aforementioned components. In an embodiment such as that of FIGURE 5 where surgical cannula 10 is shown as detachable from transfer conduit 16, the first end and intermediate portions of cryogenic liquid supply conduit 22 could consist of separate sections to facilitate easy removal of surgical cannula 10. Also, if the second end portion of cryogenic liquid supply conduit 22 shown in FIGURE 4 consists of a separate section connected to top of the cryogenic liquid supply source 18, of FIGURE 1, conduit 26 and the adsorbent in space 28 could be eliminated and replaced with an adsorbent material located in the transfer conduit in evacuable insulating 16c. Separate cryogenic liquid supply conduit sections, although permitting the use of interchangeable parts such as different sized surgical cannula, have the inherent disadvantage of requiring multiple evacuable insulating spaces rather than one continuous space.

When the surgical cannula is designed to be inserted in the brain, its outside diameter will ordinarily be less than 3 mm. and the corresponding outside diameter of the transfer conduit less than about 3 cm. In such an embodiment, a straight vacuum in the aforementioned evacuable insulating spaces will provide adequate thermal insulation to prevent any "frosting" of exterior surfaces due to the condensation of atmospheric air thereon. However, in embodiments of larger design it may be preferably to employ thermal insulating materials in one or more of the aforementioned evacuable insulating spaces. Thermal insulating materials such as those described in U.S. Patents 3,007,596, 3,009,600, and 2,967,152 would be suitable although other materials such as silica/gel would also be suitable.

The complete system as shown in FIGURE 1 or a similar system constructed using the embodiments shown in the other figures operates in the following manner.

Cryogenic liquid supply source 18 is filled with cryogenic liquid through the top 1. The second end portion of cryogenic liquid supply conduit 22 is then inserted into cryogenic liquid supply source 18 and connecting means 20 is attached to the latter by threadedly engaging connecting cap 2 to top 1. Means within cryogenic liquid supply source 18 then pressurize the cryogenic liquid stored therein for transfer to surgical cannula 10 on demand.

Before any cryogenic liquid is transferred from cryogenic liquid supply source 18, the entire transfer system from connecting means 20 to surgical cannula 10 is at substantially room temperature. Consequently, at the beginning of cryogenic liquid transfer, all of the cryogenic liquid conducted through cryogenic liquid transfer conduit 22 will vaporize because of the difference in temperature between the cryogenic liquid and the cryogenic liquid transfer conduit 22. Therefore, precooling is employed to cool the intermediate portion of cryogenic liquid supply conduit 22 before liquid is transferred to surgical cannula 10. After precooling, the cryogenic liquid subsequently transferred into surgical cannula 10 only has to cool the relatively small length of cryogenic liquid supply conduit 22 located within the surgical cannula before the full refrigerative effects of the flowing cryogenic liquid are available to refrigerate tip member 12.

To precool the intermediate portion of cryogenic liquid supply conduit 22, cryogenic liquid is permitted to flow up through the second end portion of cryogenic liquid supply conduit 22 and through the intermediate portion thereof to vents 3 located within transfer conduit 16 (see FIGURE 6) near the first end thereof. Vents 3 may be formed by perforating a small section of the intermediate portion of cryogenic liquid supply conduit 22. Such cryogenic liquid then passes into precooling space 26 through vents 3 wherein the cryogenic liquid is vaporized and conducted back toward the second end of the intermediate portion of cryogenic liquid supply conduit 22 to precool vent 34 in connecting means 20 where the precool vapor is exhausted from the system.

The amount of cryogenic liquid passed through vents 3 into precooling space 26 is controlled by a precool regulating device such as a solenoid valve (not shown) connected to precool vent 34. When the temperature of the intermediate portion of cryogenic liquid supply conduit 22 reaches the temperature of the cryogenic liquid therein, the precool regulating device will terminate the flow of cryogenic liquid through vents 3 by permitting the pressure within precool space 26 to equalize with the cryogenic liquid pressure within the intermediate portion of cryogenic liquid supply conduit 22.

During the precooling just described, a venting regulating device such as a solenoid valve, which is connected to vent 36 in connecting means 20 similarly to the aforementioned precool regulating device, maintains the pressure in venting space 24 sufficiently high to prevent cryogenic liquid transfer beyond vents 3. Consequently, there is no premature cooling of tip member 12 inasmuch as no cryogenic liquid can discharge into the first end portion of cryogenic liquid supply conduit 22 within surgical cannula 10 because of the back pressure within venting space 24.

After precooling the intermediate portion of cryogenic liquid supply conduit 22, the system is prepared for cooling localized areas surrounding tip member 12. Because of the vacuum insulation enclosing the system except for tip member 12, the refrigerating effects of the cryogenic liquid are limited to the area immediately surrounding the tip member 12 of surgical cannula 10. Therefore, surgical cannula 10 can be inserted and operated, for example, in a human brain to cool a very small area immediately surrounding tip member 12.

The temperature of tip member 12 may be manually controlled by regulating the pressure within venting space 24 and thereby controlling cryogenic liquid flow from cryogenic liquid supply conduit 22 into the hollow interior portion 12a of surgical cannula 12 or an electronically controlled system may also be used to regulate cryogenic liquid flow in the same manner. The tip temperature is monitored by a thermocouple (not shown) at the end thereof and the cryogenic liquid flow controlled in response to this monitored temperature.

The remarkable results obtainable by employing the present invention are achieved by introducing a cryogenic liquid into a surgical cannula, as described above, positioned so that its tip member is adjacent the tissue area to be destroyed. When the cryogenic liquid reaches the tip member, heat is absorbed from the surrounding tissue resulting in the cooling of such tissue and at least partial vaporization of the cryogenic liquid within the cannula tip member. Depending on the rate of cryogenic liquid flow into the surgical cannula, the tissue surrounding the tip may be cooled only a few degrees below its normal temperature, or the tissue may be frozen solid at a temperature substantially below $-100°$ C.

This surgical cannula is capable of cooling any portion of the central nervous system and, indeed, is capable of use in any portion of the body that could benefit from cryogenic surgery. In neurosurgical operations on the central nervous system, the advantages of using this canula are: (1) reversibility that permits testing of the effects of nerve tissue destruction prior to the actual infliction of such destruction; (2) consistent destruction of uniform areas of tissue depending on the temperature of the cannula tip and the degree of heat transfer from the tissue to the cryogenic liquid within the cannula tip; (3) destruction of tissue remarkably sharply delimited from the surrounding tissue; (4) and control of the area of tissue destruction permitting minute modification of such area by lowering or raising the tissue temperature in response to the rate of cryogenic liquid flow through the cannula. The significance of these advantages will be set forth in detail subsequently.

The phenomenon of performing successful brain surgery by freezing brain tissue, is predicated on known physical laws and characteristics of heat transfer. For example, consider the freezing of a gelatin preparation by a cryogenic liquid flowing to a cannula with its tip adjacent the gelatin area to be frozen. (Gelatin has been chosen as an example because the heat transfer characteristics of gelatin are well known to approximate the heat transfer characteristics of brain tissue). It has been empirically determined that the temperature of the area surrounding the tip is dependent on the heat storage capacity of the substance to be frozen and inversely dependent on the radius of the frozen area produced.

For freezing biological substances, it is necessary to calibrate the particular cannula used to determine the precise diameter of the area frozen and the rate of temperature decrease produced at various distances from the cannula tip. However, in a gelatine preparation using a cannula having a 2 mm. spherical tip maintained at $-50°$ C., the temperature, determined empirically, 3 mm. from the side of the spherical cannula tip is 0° C. The total diameter of the frozen sphere is, on including the 2 mm. diameter of the spherical cannula tip, 8 mm. It has been experimentally determined that a spherical cannula tip 2 mm. in diameter will produce a frozen sphere of gelatine 8 mm. in diameter within 2 minutes when the tip temperature is maintained at $-50°$ C.

During the development of the cryogenic surgical system described above, numerous superficial and deep brain tissue destructions (hereinafter called "lesions") have been produced and studied, grossly and microscopically. FIGURE 7 is a reproduction of an X-ray showing the surgical cannula in place as it might appear during an operation. These operations have demonstrated conclusively that lesions of consistent size, shape and appearance are consistently reproduced by operations performed under similar conditions. The extent of the lesions is primarily dependent on the freezing temperature of the tip member, and to a lesser extent on the location of the lesion within the brain or the time of exposure to freezing temperatures.

Because of the steep gradient in heat loss within a few millimeters of the tip member as shown by the gelatin experiment described above, tissue 1 mm. away from the edge of the frozen lesion is cooled only to a temperature of approximately 10° C. where a tip member temperature of −50° C. is employed. A temperature of 10° C. while low enough to produce physiological inhibition in the tissue up to 1 mm. away from the frozen lesion, is not low enough to produce any pathological tissue changes beyond this point. Consequently, a frozen lesion should be expected to have a clear cut edge, with normal tissue cells remaining intact within 1 mm. of the lesion. This has been proved experimentally.

When a lesion is produced with a spherical cannula tip member, a small circular zone of freezing surrounds the tip member within 5 seconds of the onset of a subzero freezing temperature. In the temperature range of −20° C. to −100° C., the frozen lesion reaches 80% of its eventual size within the first 30 seconds. If freezing temperatures are maintained for periods up to 5 minutes, there is only an additional 20% growth in the size of the lesion, and the temperature of the lesion remains constant. The cannula tip member is in the geometric center of the lesion. When the frozen lesion returns to normal brain temperature of 37° C., the surgical cannula may be lifted free from the lesion without any adherence of previously frozen tissue.

Microscopically, the size of the lesion is essentially temperature dependent with the volume of the lesion very closely following the experiments carried out in gelatin. A lesion produced by freezing for 3 minutes at −40° C., has a maximum diameter of 6 mm.; freezing at −50° C. for 3 minutes produces a lesion with a maximum diameter of 8 mm.; freezing at −100° C. for 3 minutes produces a lesion with a maximum diameter of 12 mm.

The technique of cryogenic surgery is simple, safe, rapid, easily controllable, and with virtually no deleterious side effects upon the patient. It consists of placing the non-insulated cannula tip member in the center of any predetermined area of tissue which is to be frozen. Since the localization of the cannula tip member is carried out using normal brain surgery procedures, it may be employed with local anesthesia. In such instances, control of the lesion size may be by control of the tip member temperature and also by clinical examination of the patient to verify the extent of the cooled or frozen area.

The use of extreme cold, localized within the center of a brain tumor by means of the surgical cannula of the present invention, is ideal for the purpose of destroying tumors in situ. Tumors otherwise inaccessible for surgical purposes have been destroyed without any adverse postoperative effects. The risk to life or neurological or psychological functions is minimal due to the inherent safety margin in the cooling and freezing method.

While certain preferred embodiments of the present invention have been shown and described, it is to be understood that various modifications and combinations may be employed, all within the scope of the invention.

What is claimed is:

1. Apparatus comprising the combination of: a surgical cannula for controlled freezing of tissue in indirect heat exchange with a cryogenic liquid supplied from a source thereof which comprises a thermally conductive tip member for localized freezing of such tissue having a hollow interior portion for receiving such cryogenic liquid, a cannula conduit having concentric inner and outer tubes gas-tightly joined to said tip member with an annular elongated gas-tight space between the tubes extending to said tip member and having a vacuum therein to restrict the refrigerative effects of such cryogenic liquid to an area immediately surrounding said tip member, said cannula conduit being constructed and arranged to provide a venting space within the inner tube thereof in fluid communication with the hollow interior portion of said tip member to provide for the venting of fluid from the latter; a transfer conduit joined to said surgical cannula having inner and outer tubes with an elongated gas-tight space between the tubes having a vacuum therein; means for connecting said transfer conduit to a cryogenic liquid supply source; and a cryogenic liquid supply conduit communicating with a cryogenic liquid supply source and extending through the inner tube of said transfer conduit and the inner tube of said cannula conduit and terminating within the hollow interior portion of said tip member.

2. Apparatus according to claim 1 including means for controlling the discharge of cryogenic liquid into the hollow interior portion of said tip member.

3. Apparatus according to claim 1 wherein said tip member is threadably engageable to said cannula conduit.

4. Apparatus according to claim 1 wherein said cannula conduit is threadably engageable to said transfer condit.

5. Apparatus according to claim 1 wherein at least a portion of the inner and outer tubes comprising said transfer conduit is constructed and arranged as inner and outer bellows tubes.

6. Apparatus according to claim 1 wherein the hollow interior portion of the surgical cannula tip member is constructed and arranged to provide heat transfer fins for the recovery of refrigeration from the fluid venting from said tip member.

7. Apparatus according to claim 1 wherein the inner and outer tubes comprising said transfer conduit are constructed and arranged as inner and outer bellows tubes, a first section of which joins to said cannula conduit and is more flexible than a second section of which joins to the means for connecting said transfer conduit to a cryogenic liquid supply source.

8. A surgical cannula for controlled freezing of tissue in indirect heat exchange with a cryogenic liquid supplied from a source thereof which comprises a thermally conductive tip member for localized freezing of such tissue having a hollow interior portion for receiving such cryogenic liquid, a cannula conduit having concentric inner and outer tubes gas-tightly joined to said tip member with an annular elongated gas-tight space between the tubes extending to said tip member and having a vacuum therein to restrict the refrigerative effects of such cryogenic liquid to an area immediately surrounding said tip member, said cannula conduit being constructed and arranged to provide a venting space within the inner tube thereof in fluid communication with the hollow interior portion of said tip member to provide for the venting of fluid from the latter, and a cryogenic liquid supply conduit extending through said cannula conduit and terminating within the hollow interior portion of said tip member.

9. Apparatus comprising the combination of: a surgical cannula for controlled freezing of tissue in indirect heat exchange with a cryogenic liquid supplied from a source thereof which comprises a thermally conductive tip member for localized freezing of such tissue having a hollow interior portion for receiving such cryogenic liquid, a cannula conduit having concentric inner and outer tubes gas-tightly joined to said tip member with an annular elongated gas-tight space between the tubes extending to said tip member and having a vacuum therein to restrict the refrigerative effects of such cryogenic liquid to an area immediately surrounding said tip member, said cannula conduit being constructed and arranged to provide a venting space within the inner tube thereof in fluid communication with the hollow interior portion of said tip member to provide for the venting of fluid from the latter, a cryogenic liquid supply conduit extending through said cannula conduit and terminating within the hollow interior portion of said tip member; a transfer conduit joined to said surgical cannula for providing fluid communication between said surgical cannula and a source of cryogenic liquid; and means for connecting said transfer conduit to a cryogenic liquid supply source.

10. Apparatus according to claim 8 wherein said tip member is threadably engageable to said cannula conduit.

11. Apparatus according to claim 8 wherein the hollow interior portion of the surgical cannula tip member is constructed and arranged to provide heat transfer fins for the recovery of refrigeration from the fluid venting from said tip member.

12. Apparatus according to claim 8 wherein a vent conduit is provided in said venting space in fluid communication with said hollow interior portion for the venting of fluid therefrom.

References Cited by the Examiner

UNITED STATES PATENTS

| | | | |
|---|---|---|---|
| 2,124,831 | 7/1938 | Roos | 128—399 X |
| 2,523,809 | 9/1950 | Bronk | 128—400 X |
| 2,610,627 | 9/1952 | Watt | 128—239 |
| 2,645,097 | 7/1953 | Posch | 128—399 X |
| 2,649,861 | 8/1953 | Melsheimer | 128—369 |
| 2,672,032 | 3/1954 | Towse | 165—142 |

RICHARD A. GAUDET, *Primary Examiner.*

RICHARD J. HOFFMAN, LOUIS R. PRINCE,
*Examiners.*